United States Patent [19]

Gander et al.

[11] Patent Number: 4,516,812

[45] Date of Patent: May 14, 1985

[54] STORAGE APPARATUS

[76] Inventors: Terence W. Gander, 47 Fernbank Pl., North Ascot, Berkshire, England; Charles G. Widden, 313 Ashford Rd., Staines, Middlesex, England, TW18 1QJ

[21] Appl. No.: 621,067

[22] Filed: Jun. 15, 1984

Related U.S. Application Data

[63] Continuation of Ser. No. 410,020, Aug. 20, 1982, abandoned.

[30] Foreign Application Priority Data

Sep. 11, 1981 [GB] United Kingdom ................. 8127482

[51] Int. Cl.³ ................................................ G11B 1/02

[52] U.S. Cl. ...................................... 312/12; 206/425; 206/444; 206/454; 220/22.2; 312/15; 312/18; 312/183

[58] Field of Search ..................... 312/12, 15, 18, 183; 206/425, 444, 454; 220/22.2

[56] References Cited

U.S. PATENT DOCUMENTS

| | | | |
|---|---|---|---|
| 2,182,460 | 12/1939 | Werner | 312/12 |
| 2,720,438 | 10/1955 | Musick | 312/320 X |
| 4,091,918 | 5/1978 | Soulakis et al. | 206/425 |
| 4,182,538 | 1/1980 | Armistead | 312/12 |

*Primary Examiner*—William E. Lyddane
*Assistant Examiner*—Joseph Falk

[57] ABSTRACT

Storage apparatus for flexible discs or other articles (13) includes a housing (11) and a mechanism in the housing having a carrier or a series of carriers for holding the articles. The carrier comprises a slider (35) constrained within the housing to move rectilinearly relative thereto and a lever (37) pivotally connected with the housing and coupled with the slider for movement in conjunction therewith from a storage position to an access position. The carrier is adapted to displace articles differentially during movement to the access position. Retaining means such as a pin and slot coupling (90, 91) are provided on the carrier and the position of the carrier is maintained when in the access position by the weight of articles held therein acting on the retaining means.

12 Claims, 5 Drawing Figures

STORAGE APPARATUS

This is a continuation, of application Ser. No. 410,020 filed Aug. 20, 1982.

The present invention relates to apparatus for storing articles.

Storage apparatus is used for holding a variety of different kinds of articles. Flexible, or floppy, discs for microprocessor and computer systems for example need to be stored, often in large numbers, in a relatively compact manner and so that each disc is readily accessible when required.

A known type of box for storing flexible discs is divided into compartments. Each compartment accommodates a carrier movable up and down relative to the box which includes a first plate extending through the full height of the box and slidable between a retracted position within the box and a raised access position. Connected with the first plate at a lower part thereof is a series of further plates, the connections between successive plates being in the form of pins on one plate engaging in slots in the other plate which are aligned in the direction of displacement of the carrier between its retracted and access positions. The slots afford differential displacement of progressive magnitude of the plates when the carrier is moved to the access position. In the retracted position the further plates have co-planar edge surfaces on which may be supported respective flexible disc sleeves. Thus on displacement of the carrier to the access position the discs are serially spread to reveal pertinent matter and facilitate separate withdrawal thereof from the box. The plates can be held in the access positions by locking a further pin on the first plate into a corresponding slot in the adjacent compartment wall. There is the advantage that the discs are easily accessible on displacement since they are retained in differentially displaced positions. However, the mechanism providing for storage of and access to the sets of discs within each compartment is relatively complex and consequently expensive to manufacture and construct. Six plates are needed for five discs, with slots in each plate and pins connected with the plates to slide along the slots.

The present invention provides storage apparatus for articles such as flexible discs which can be constructed from a small number of movable parts with the consequent possibility of cost-saving and ease of manufacture as compared with the apparatus described above.

In another type of storage apparatus, described in U.S. Pat. No. 2,720,438, records are stored on their sides in a cabinet and can be brought forward through different distances by a pivoted stepped ejector having shoulders which engage the rear edges of respective records. This apparatus is designed only for horizontal displacement of records.

Storage apparatus of the present invention is capable of displacing articles differentially relative to one another in the vertical direction and of maintaining those articles in their displaced positions.

Accordingly, the present invention provides storage apparatus comprising a housing and a mechanism supported in the housing having a carrier adapted to hold a plurality of articles, wherein the carrier comprises a slider constrained within the housing to move rectilinearly relative thereto and a lever pivotally connected with the housing and coupled with the slider for movement in conjunction therewith from a storage position to an access position, the carrier being adapted so as to displace articles differentially relative to one another during movement thereof to the access position, characterised in that retaining means are provided on the carrier and the position of the carrier is maintained when in the access position by the weight of articles held therein acting on the retaining means. Thus, storage apparatus according to the invention can be constructed with a mechanism having only two moving parts, a lever and a slider, and in the access position the weight of articles held by the carrier maintains the position of the carrier.

Suitably the retaining means comprise inter-engaging parts on the lever and slider, whereby the weight of articles acting on the carrier in the access position causes locking of the inter-engaging parts and application of a counteracting force to the parts causes release for return of the carrier to the storage position. The retaining means may comprise, for example, a pin and slot coupling of which the respective parts are formed one on the slider and the other on the lever.

In one form of the invention, the housing of the apparatus is adapted to support a plurality of mechanisms having respective carriers and the mechanisms are aligned with their levers rotatable about a common axis and their sliders movable in parallel planes.

The invention will now be described, by way of example, with reference to the accompanying drawings in which.

Figure 4:
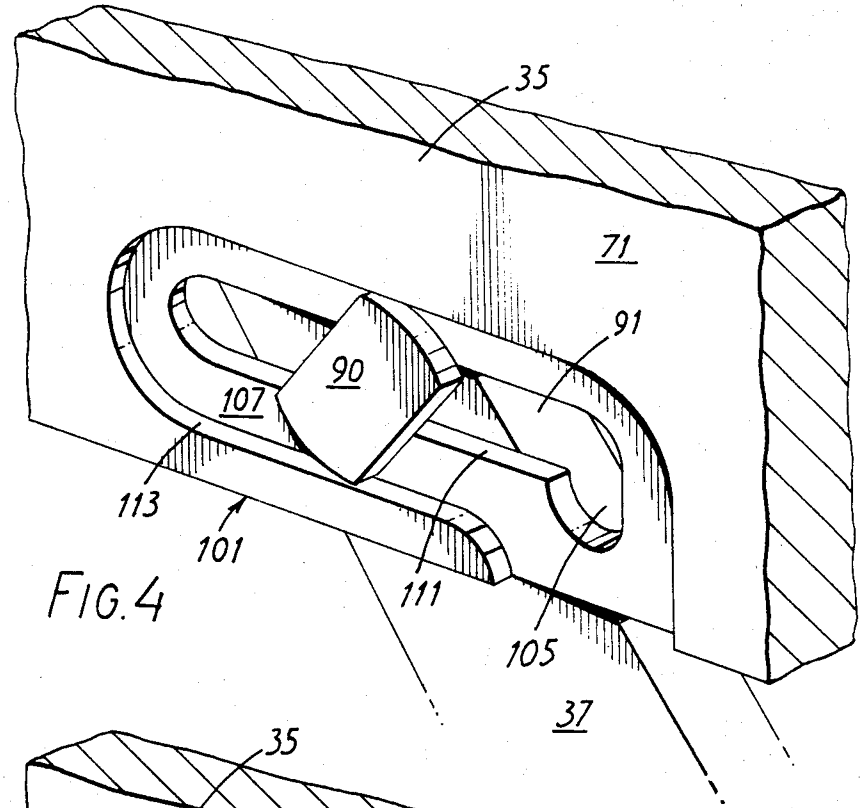
Figure 5:
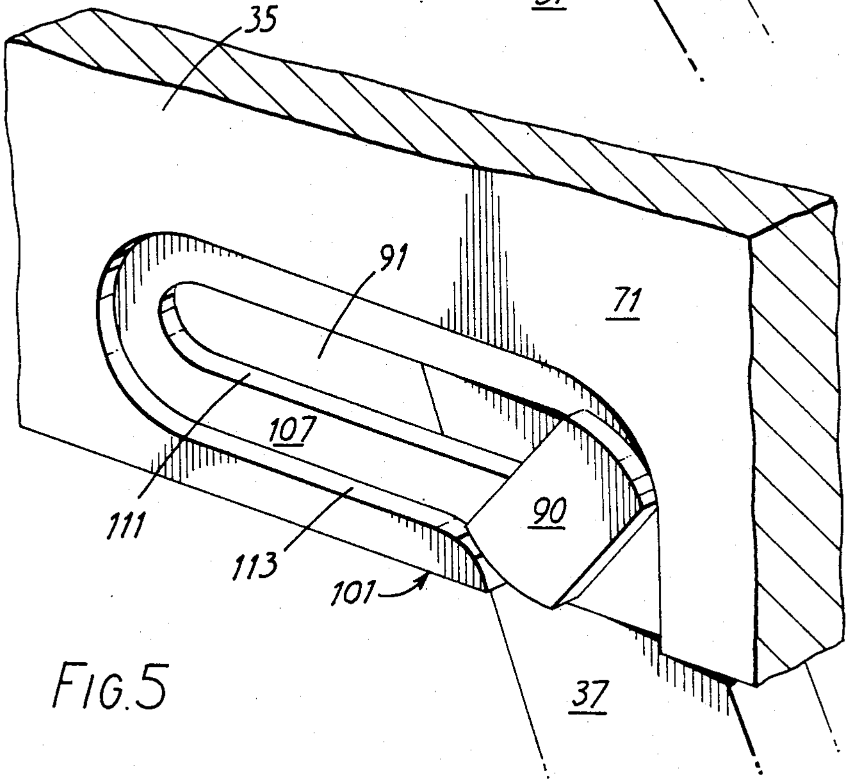

and FIGS. 4 and 5 are perspective views of a detail of the apparatus of the preceding figures in two different positions.

Figure 1:
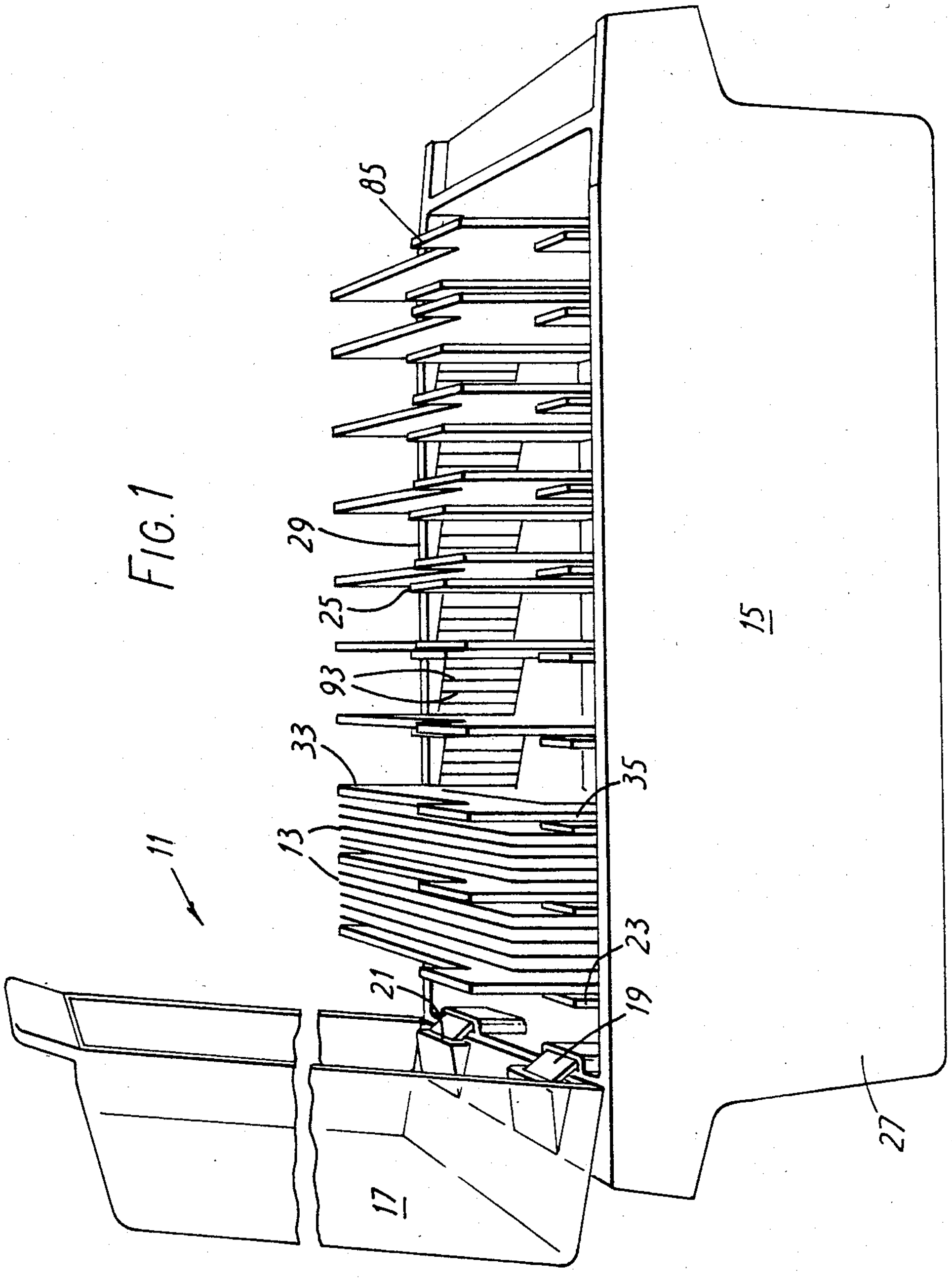
FIG. 1 is a diagrammatic perspective view of an embodiment of storage apparatus according to the present invention.

Referring to the drawings, FIG. 1 shows storage apparatus for flexible or floppy discs or the like, comprising a housing 11 for discs contained in sleeves 13, which has a body 15 and a lid 17 attached to the body by means of hinges 19, 21. Both the body and the lid are moulded from plastics material, the lid being made from transparent polycarbonate and the body from opaque ABS co-polymer.

Figure 3:
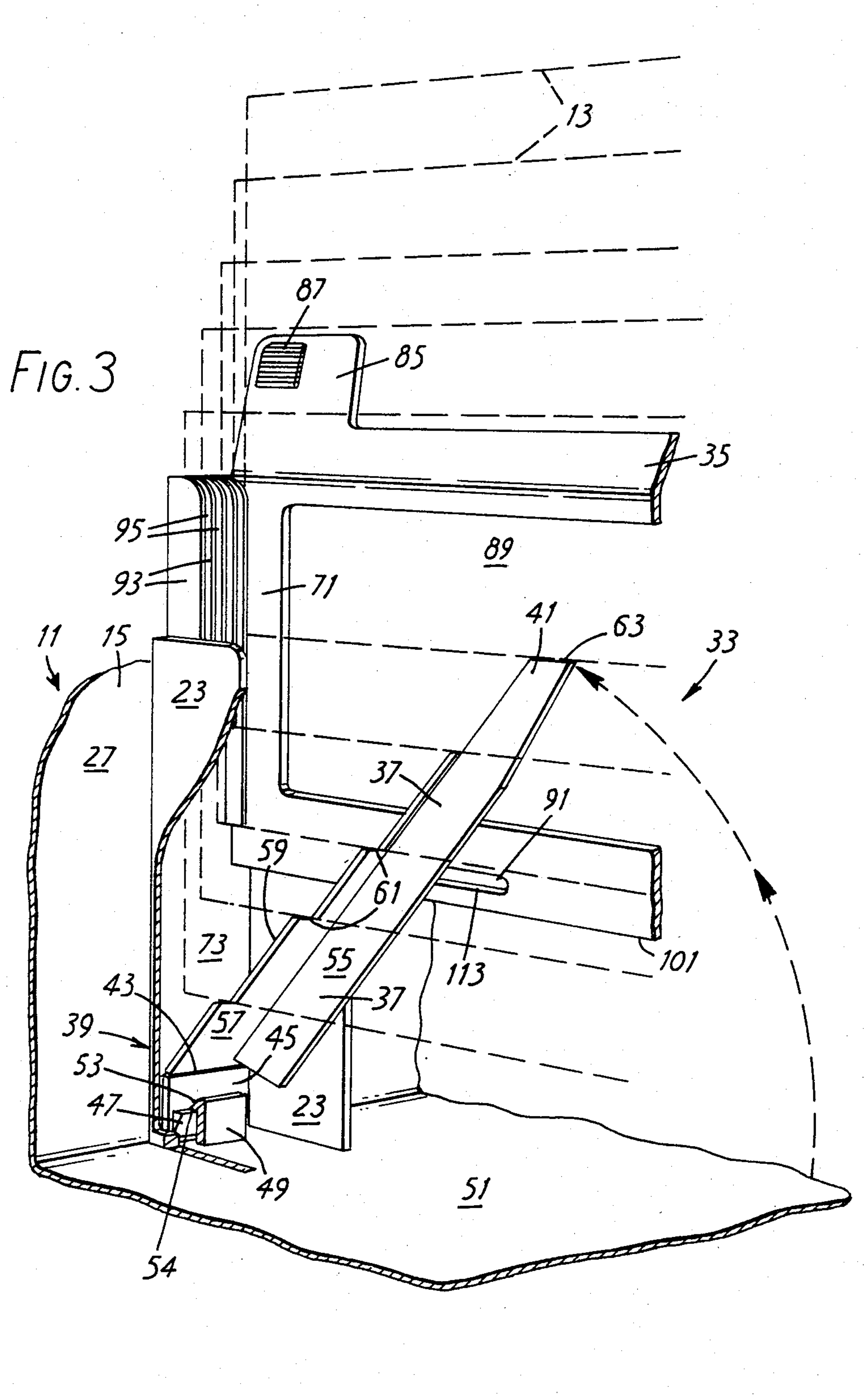

The body 15 of the housing is divided into a number of compartments by pairs of short opposing walls 23, 25 extending from respective upright sides 27 and 29 of the body in the direction normal to the sides and for the full height thereof, as shown most clearly, in the case of wall 23, in FIG. 3. Between each pair of walls 23 and the corresponding opposing walls 25 is a mechanism 31 for storing a series of articles, in this case a set of five flexible discs in sleeves 13. Each of the mechanisms includes a carrier 33 which holds the articles and comprises a slider 35 and a lever 37.

Lever 37 can be seen in FIGS. 2 to 5 and comprises an elongate are formed as an injection moulding of polypropylene co-polymer. One end 39 of the arm is connected for pivotal movement of the lever, whilst the other end 41 is free. Near end 39 is a transverse weakened region 43 in the material to provide for the pivoting, which divides the lever into two portions. The end portion 45 of the lever has an inwardly facing downwardly tapered wedge-like projection 47 which, when the lever is located in the apparatus as shown in the figures, is held in interlocking engagement between side wall 27 of the housing and an upstanding part 49 formed on the base 51 of the housing. The part 49 at its upper end is of increased thickness and is formed with a surface 53 which is downwardly inclined towards the wall 27. At the lower edge of the surface 53 the part 49 includes an inwardly directed ledge 54. The lever is fixed in position, with the portion 45 thereof between the part 49 and the sidewall 27, when the wedge-like projection 47 engages and slides along the surface 53 until the projection 47 passes the surface 53 and is hooked beneath the ledge 54. The portion 45 is thus firmly lodged between wall 27 and part 49 on the base of the housing. Lever 37 is consequently held securely and is free to pivot about the weakened region 43 which affords a pivotal axis parallel with the side walls 27 and 29. The pivotal portion of the arm has a flange 55 which lies in a plane parallel to the plane of the dividing wall and a platform part 57 formed in one with and normal to the flange 55, the platform being formed with a staggered edge 59. Along this area are four abutments 61 having short and flat engaging surfaces for articles, which are angled at about 45° to the plane of the platform part 57. A fifth abutment 63 also having a flat engaging surface is provided on the free end of the lever.

Figure 2:
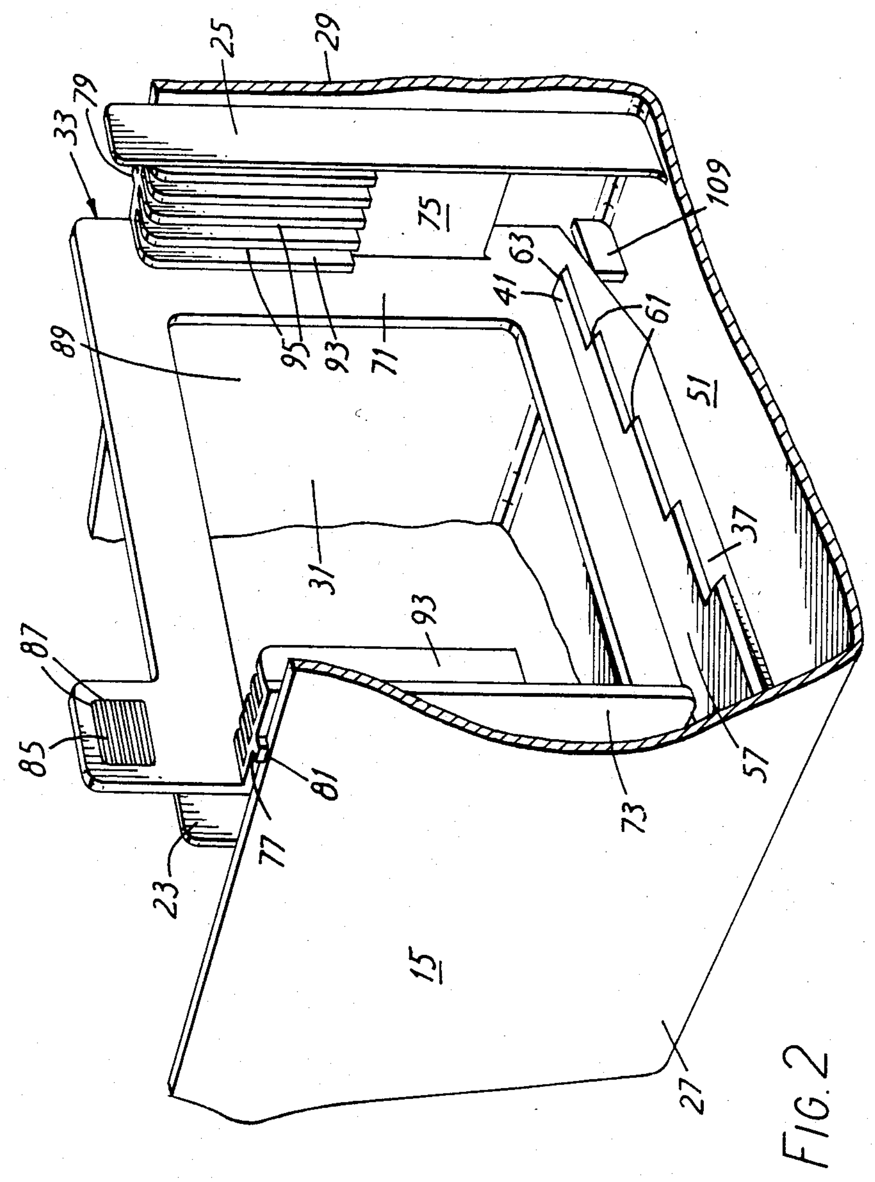
FIGS. 2 and 3 are fragmentary perspective views of parts of the apparatus shown in FIG. 1, FIG. 2 showing the apparatus with a carrier in the storage position and FIG. 3 showing a carrier in the access position with the positions of disc sleeves shown in broken lines.

The slider 35 is a unitary moulded structure of ABS plastics material, comprising a generally rectangular back plate 71 which serves as a joining wall between two opposing side walls 73 and 75. The plate 71 extends the full width of the housing so that the sides 73 and 75 lie adjacent the respective sides 27 and 29 of the housing, and there is interengagement of complementary elements on the housing and slider. These elements include ribs 77 and 79 which project from the outer surfaces of sides 73 and 75, and extend parallel with the back plate 71, and there are corresponding guides or channels, only one of which, 81, is seen in FIG. 2, in which the sides 27 and 29 of the housing are engaged. The back plate 71 is formed with a tab 85 having ridges 87 for gripping the tab, situated at an upper corner thereof with the apparatus disposed as shown in FIGS. 1 to 3, which serves for raising and lowering the slider. The plate 71 also has a rectangular aperture 89, which reduces the amount of material needed for moulding the slider and also lowers the weight of the apparatus.

Each of the side walls 73 and 75 has five short ribs 93 projecting inwardly therefrom and parallel with back plate 71. These ribs are flat-sided and are about half the length of the side walls, being disposed on upper sections of the side walls. The five pairs of ribs and the back plate 71 between them form five pairs of opposing grooves 95. Each of the pairs of grooves is aligned with one of the engaging surfaces on the abutments 61 and 63 on the lever and the grooves and surfaces thus form locating means which serve in the projected position to support respective discs in parallel planes extending normal to the axis of pivoting of the lever, whilst in the storage position the discs are supported within the grooves and on the platform 57 of the lever.

Interconnection between the lever and slider is provided by a pin 90 and a slot 91, the pin being mounted on the surface of flange 55 facing away from platform 57 and the slot being formed along a midlength portion of the slider near the lower edge of the back plate 71.

FIGS. 4 and 5 illustrate in greater detail the interengaging pin and slot arrangement on the lever and slider. Both of these figures give a view from behind the back plate, i.e. as seen from behind the plate in FIG. 3. The slider has an elongate slot 91 extending parallel with its bottom edge 101, with a downward turn 105 at the end thereof nearest the pivot axis of the lever which extends along region 43. Surrounding the slot is a border region 107 of reduced thickness which permits movement of the pin 90 along the slot. Pin 90 has a large flat head adapted for movement along the region 107 and for retention when the pin enters the downward turn 105.

FIG. 1 shows a number of flexible discs stored in the compartments of the housing which are divided from one another by the walls 23, 25. The discs, in protective sleeves, are in sets of five and adjacent disc sleeves in the sets are held apart by the ribs 93 of the sliders. Although all the discs can conveniently be stored as shown, a particular disc cannot readily be identified and removed from storage. In order to provide for inspection of the discs, or removal thereof, each of the carriers 33 can be moved from the storage position of FIGS. 1 and 2 to an access position as shown in FIG. 3. This movement is most conveniently achieved by using tab 85, with ridges 87 which facilitate gripping, to lift the slider 35. Upward movement of the slider is guided by the channels (81) in the sidewalls of the housing, which are engaged by the corresponding ribs 77, 79 on the slider. Initially, in the storage position, the bottom edge 101 of the back plate of the slider rests on small projections 109 (one of these is shown in FIG. 2) on the base 51 of the housing near the sides thereof, whilst the lower edges of the sleeves of the discs rest on part 57 of the lever arm lying parallel with base 51, each disc being immediately above a corresponding one of the surfaces of abutments 61 or 63 on the lever. Pin 90 projects from the back of the lever through the slot 91 at the right-most side thereof as seen in FIG. 3, this corresponding with the left side in FIGS. 4 and 5. Because of this interengagement of the lever and slider, these constituents of the carrier move in conjunction, and raising of the slider causes the lever to pivot and turn in the direction of the arrow in FIG. 3. During this motion, pin 90 passes along slot 91 towards and into turned end 105 thereof, the flat head of the pin, which is fixed relative to the lever, gradually twisting relative to the slot, from being upright initially to being inclined at approximately 45° to the axis of the slot at the other extremity of its movement, as seen in FIG. 5.

As the slider moves upwards and the lever arm rotates, the discs are constrained by the ribs 93 and corresponding grooves 95 to move upwards also. However, they no longer rest on the flat surface of platform 57 of the lever, but at first against the corners of abutments 61, 63 and eventually against the flat surfaces thereof as these are brought parallel to the lower edges of the disc sleeves. This position of the lever and slider with the disc sleeves resting on the flat surfaces is the second extreme position of the carrier since the pin 90 engages the turned end of slot 91 as shown in FIG. 5, preventing further upward movement of the slider. This is the position for access to the flexible discs, since, as indicated in FIG. 3, the discs in sleeves 13 are differentially displaced relative to one another and a selected disc can easily be removed and replaced or the set of discs inspected.

The carrier is maintained in the access position by the weight of the discs acting on the inter-engaging pin 90 and slot 91. Referring to FIGS. 3 and 5, which show the carrier in the access position, the weight of the discs bears on the flat engaging surfaces of abutments 61, 63 on the lever, consequently causing the pin 90 to press downwards on the lower edge 111 of the turn 105 of the slot 91 and the edge of the head of the pin to press against the lower edge 113 of the region 107. The pin and slot are therefore effectively locked together and the position of the lever and slider is maintained in the access position. In order to lower the slider, pressure is applied downwardly thereto, which releases the pin from engagement against the lower edges of the slot and the region 107, thereby allowing the pin to leave the downward turn of the slot and to re-enter the main part of the slot. The carrier is accordingly able to return to the storage position under the weight of the discs, which now acts to push the pin along the slot away from the turned end thereof.

Whilst the apparatus described is particularly suitable for storing flexible discs, other flat articles could be stored by varying the width of the grooves 95, and of the back plate of the slider, and other dimensions of the apparatus accordingly. Further modification would enable other articles such as cassettes to be stored.

It will be appreciated that changes could be made to the illustrated embodiment without having any material effect on the operation of the mechanism. For example, the slot could be located on the lever and the pin on the slider, or alternative retaining means could be used.

In order to accommodate floppy discs having relatively small diameters which are therefore contained in sleeves of smaller width, there may be provided grooved fittings which engage over the ribs 93 to provide facing grooves on the side walls 73 and 75 the bottoms of which facing grooves are accordingly spaced closer together than the bottoms of opposing grooves 95.

We claim:

1. Storage apparatus comprising a housing and a mechanism supported in the housing having a carrier adapted to hold a plurality of articles in respective planes, wherein the carrier comprises a slider constrained within the housing to move rectilinearly relative thereto and a lever pivotally connected with the housing and coupled with the slider for movement in conjunction therewith from a storage position to an access position, the carrier being adapted so as to displace articles rectilinearly along said respective planes and differentially relative to one another during movement thereof to the access position, and wherein retaining means are provided on the carrier and the position of the carrier is maintained when in the access position by the weight of articles held therein acting on the retaining means.

2. Storage apparatus as claimed in claim 1, wherein the retaining means comprise inter-engaging parts on the lever and slider, whereby the weight of articles acting on the carrier in the access position causes locking of the inter-engaging parts and application of a counteracting force to the parts causes release for return of the carrier to the storage position.

3. Storage apparatus as claimed in claim 2, wherein the interengaging parts comprise a pin and slot coupling of which the respective parts are formed one on the slider and the other on the lever.

4. Storage apparatus as claimed in claim 2, wherein the carrier includes locating means for articles comprising pairs of opposed grooves on the slider, the articles being locatable between respective pairs of grooves in side by side relationship.

5. Storage apparatus as claimed in claim 2, wherein the carrier is adapted so that in the access position the weight of articles acts on the lever and the lever has a series of abutments differentially spaced from the pivotal axis of the lever and adapted to engage respective articles during movement between access and storage positions and in the access position.

6. Storage apparatus as claimed in claim 5, including pairs of opposed grooves on the slider for locating articles adapted for storing articles in closely spaced side by side relationship, the articles being flat and generally planar and having respective straight edges facing said abutments on the lever, wherein each abutment comprises a generally flat surface, and in the access position edges of the articles lie parallel to and rest on said surfaces on the lever.

7. Storage apparatus as claimed in claim 6, wherein the pairs of grooves accommodate the respective articles in parallel planes extending normal to the pivotal axis of the lever, the pairs of grooves being aligned respectively with the abutments on the lever.

8. Storage apparatus as claimed in claim 7, wherein the housing and slider have at least one pair of complementary engaging elements for movement of the slider rectilinearly between the storage and access positions.

9. Storage apparatus as claimed in claim 1, wherein the housing is adapted to support a plurality of said mechanisms having respective carriers and the mechanisms are aligned with their levers rotatable about a common axis and their sliders movable in parallel planes.

10. Storage apparatus comprising a housing and a mechanism supported in the housing having a carrier adapted to hold a plurality of articles wherein the carrier comprises a slider constrained a within the housing to move retilinearly relative thereto and a lever pivotally connected with the housing and coupled with the slider for movement in conjunction therewith from a storage position to an access position, the carrier being adapted so as to displace articles differentially relative to one another during movement thereof to the access position, and wherein retaining means are provided on the carrier and the position of the carrier is maintained when in the access position by the weight of articles held therein acting on the retaining means, the retaining means comprising inter-engaging parts on the lever and slider, the inter-engaging parts comprising a pin and slot coupling of which the respective parts are formed one on the slider and the other on the lever, whereby the weight of the articles acting on the carrier in the access position causes locking of the inter-engaging parts and application of a counteracting force to the parts causes release for return of the carrier to the storage position.

11. Storage apparatus for flat disks in sleeves, said apparatus comprising:

A. a housing having
   (i) an open top,
   (ii) side walls
   (iii) a bottom wall, and
   (iv) a back wall and a front wall;

B. a lid removably covering the open top of the housing;

C. plural mechanisms arranged in mutual parallel relationship between the front and back walls of the housing and supported therein on the side walls independently of one another;

D. each said mechanism including a carrier adapted to hold a plurality of flat sleeved disks;

E. each carrier comprising (i) a slider, (ii) means to mount the slider for rectilinear movement normal to the bottom wall of the housing, the slider projecting above the top of the housing when the slider is raised to access position, (iii) means providing pairs of opposed grooves on the sliders for locating flat disks in sleeves in respective vertical planes parallel to the front and back walls of the housing, (iv) a lever pivotally connected with the housing by and coupled a pin and slot coupling of which the respective parts are formed, one on the slider and the other on the lever, so that lifting the slider from a lower storage position to a raised access position swings the lever upwardly; and F. said lever having a series of distal abutments differentially radially spaced from the pivotal connection of the lever to the housing and disposed to engage different sleeved disks upon upward movement of the slider from storage position to access position to differentially raise such sleeved disks relative to one another during movement of the carrier from said storage position to said access position;

G. said slot having a downturned end into which the pin rides when the carrier is in said access position to maintain the carrier in such access position by the weight of the carrier and the sleeved disks held therein to pock the lever and the slider together, whilst application of a counteracting force to the pin and slot causes release of the carrier to storage position.

12. Storage apparatus as claimed in claim 11 wherein the housing and the lid are of plastics material, the lid being transparent and the housing being opaque.

* * * * *

UNITED STATES PATENT AND TRADEMARK OFFICE
CERTIFICATE OF CORRECTION

PATENT NO. : 4,516,812

DATED : May 14, 1985

INVENTOR(S) : TERENCE W. GANDER

It is certified that error appears in the above-identified patent and that said Letters Patent are hereby corrected as shown below:

On the title page the following should be added:

[73] Assignee: Willis Computer Supplies Limited

Signed and Sealed this

*Eighteenth* Day of *March 1986*

[SEAL]

*Attest:*

DONALD J. QUIGG

*Attesting Officer* *Commissioner of Patents and Trademarks*